US012217893B2

(12) United States Patent
Suzuki et al.

(10) Patent No.: US 12,217,893 B2

(45) Date of Patent: Feb. 4, 2025

(54) LAMINATED COIL COMPONENT

(71) Applicant: Murata Manufacturing Co., Ltd., Kyoto-fu (JP)

(72) Inventors: Yuudai Suzuki, Nagaokakyo (JP); Katsuhisa Imada, Nagaokakyo (JP); Makoto Hiraki, Nagaokakyo (JP); Ikuno Sugiyama, Nagaokakyo (JP); Hiroshi Ueki, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 654 days.

(21) Appl. No.: 17/548,405

(22) Filed: Dec. 10, 2021

(65) Prior Publication Data

US 2022/0189674 A1 Jun. 16, 2022

(30) Foreign Application Priority Data

Dec. 16, 2020 (JP) ................................ 2020-208649

(51) Int. Cl.

*H01F 17/00* (2006.01)
*H01F 27/29* (2006.01)
*H01F 27/32* (2006.01)

(52) U.S. Cl.

CPC ....... *H01F 17/0013* (2013.01); *H01F 27/292* (2013.01); *H01F 27/32* (2013.01)

(58) Field of Classification Search

CPC ..... H01F 17/0013; H01F 27/292; H01F 27/32
USPC .......................................................... 336/200
See application file for complete search history.

(56) References Cited

U.S. PATENT DOCUMENTS

| | | | | | |
|---|---|---|---|---|---|
| 9,722,566 | B1 * | 8/2017 | Williams | H03H 3/00 |
| 9,892,841 | B2 * | 2/2018 | Choi | H01F 17/0013 |
| 2020/0251273 | A1 * | 8/2020 | Takai | H01F 27/292 |
| 2021/0249178 | A1 * | 8/2021 | Imada | H01F 27/2804 |
| 2023/0162899 | A1 * | 5/2023 | Imada | H01F 27/2847 336/199 |

FOREIGN PATENT DOCUMENTS

| | | | |
|---|---|---|---|
| JP | 2010073711 | A * | 4/2010 |
| JP | 5314370 | B2 * | 10/2013 |
| JP | 2017-059749 | A | 3/2017 |

* cited by examiner

*Primary Examiner* — Shawki S Ismail
*Assistant Examiner* — Joselito S. Baisa
(74) *Attorney, Agent, or Firm* — Studebaker & Brackett PC

(57) ABSTRACT

A laminated coil component includes a multilayer body in which a coil, which is obtained by electrically connecting a plurality of coil conductors with a via conductor interposed therebetween, is provided in an inside of an insulator portion which is obtained by laminating a plurality of insulation layers. Each of a first coil conductor and a second coil conductor that are adjacent to each other in a lamination direction and are electrically connected in series with a first via conductor interposed therebetween includes a first main surface that faces the opposite direction to the lamination direction and on which a void exists. The second coil conductor includes a second main surface that faces the lamination direction and on which another void exists, and the other void locally exists on a position opposed to the first via conductor.

20 Claims, 10 Drawing Sheets

LAMINATED COIL COMPONENT

CROSS-REFERENCE TO RELATED APPLICATION

This application claims benefit of priority to Japanese Patent Application No. 2020-208649, filed Dec. 16, 2020, the entire content of which is incorporated herein by reference.

BACKGROUND

Technical Field

The present disclosure relates to a laminated coil component.

Background Art

As a laminated coil component, Japanese Unexamined Patent Application Publication No. 2017-59749, for example, discloses a laminated coil component in which stress relaxation spaces are formed on one surface and/or the other surface of each of a plurality of coil conductors in the lamination direction of the coil conductors.

SUMMARY

However, the laminated coil component described in Japanese Unexamined Patent Application Publication No. 2017-59749 does not exhibit sufficient stress relaxation effect when the stress relaxation space is formed only on one surface or the other surface of the coil conductors in the lamination direction.

Meanwhile, the stress relaxation space is formed along a portion other than end portions of the coil conductor so that it overlaps with the entire portion. Therefore, when the stress relaxation space is formed on one surface and the other surface of the coil conductors in the lamination direction, strength of the multilayer body may be insufficient. This case also has a problem of productivity decline because the process for forming the stress relaxation spaces (a step for applying a $ZrO_2$ paste by screen printing) is added.

Accordingly, the present disclosure provides a highly productive laminated coil component that realizes further relaxation of internal stress while securing strength of a multilayer body.

A laminated coil component according to preferred embodiments of the present disclosure includes a multilayer body in which a coil is provided in an inside of an insulator portion which is obtained by laminating a plurality of insulation layers; and an outer electrode that is provided on an outer surface of the multilayer body and is electrically connected with the coil. The coil is formed in a manner such that a plurality of coil conductors which are laminated with the plurality of insulation layers are electrically connected with each other with a via conductor interposed therebetween. Each of the plurality of coil conductors has a first main surface facing the opposite direction to a lamination direction and a second main surface facing the lamination direction. The plurality of coil conductors include a first coil conductor and a second coil conductor which are adjacent to each other in the lamination direction. The first coil conductor and the second coil conductor are electrically connected with each other in series with a first via conductor interposed therebetween. The first coil conductor, the first via conductor, and the second coil conductor are disposed in this order in the lamination direction. The first coil conductor has a first main surface on which a void exists in a manner to be interposed between the first main surface of the first coil conductor and the insulator portion. The second coil conductor has a first main surface on which a void exists in a manner to be interposed between the first main surface of the second coil conductor and the insulator portion and a second main surface on which another void exists in a manner to be interposed between the second main surface of the second coil conductor and the insulator portion. The other void interposed between the second main surface of the second coil conductor and the insulator portion locally exists on a position opposed to the first via conductor.

According to the present disclosure, a highly productive laminated coil component that realizes further relaxation of internal stress while securing strength of a multilayer body can be provided.

Other features, elements, characteristics and advantages of the present disclosure will become more apparent from the following detailed description of preferred embodiments of the present disclosure with reference to the attached drawings.

DETAILED DESCRIPTION

A laminated coil component according to the present disclosure will be described below.

However, it should be noted that the present disclosure is not limited to the following embodiments and can be appropriately modified and applied without changing the gist of the present disclosure. The disclosure also includes combinations of two or more of the individual desirable structures described below.

First Embodiment

Figure 1:
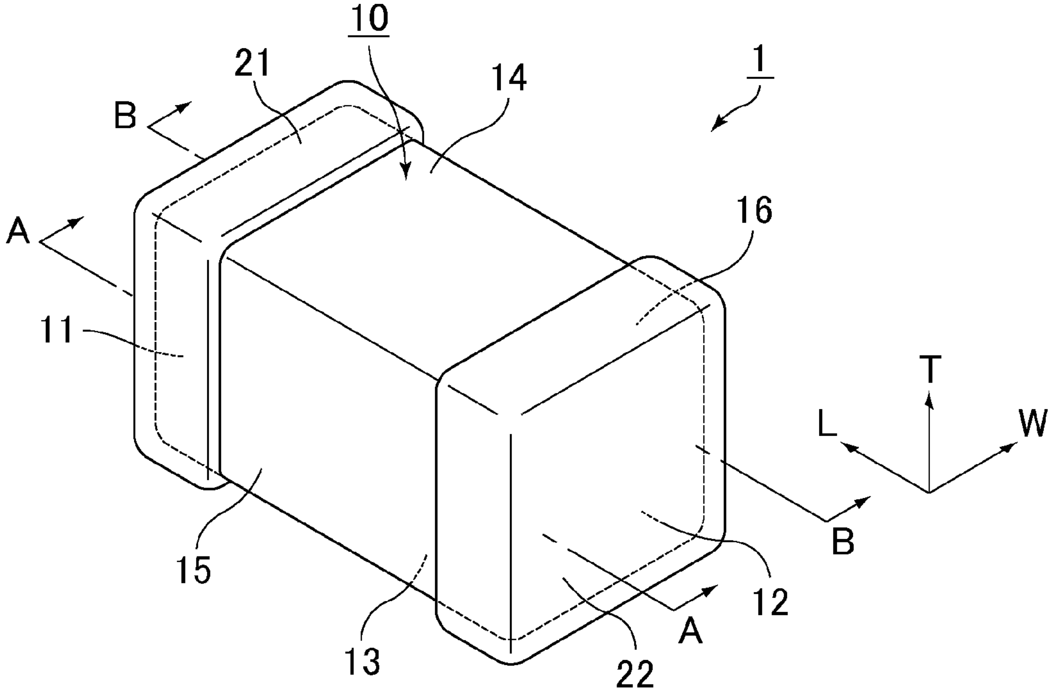
FIG. 1 is a perspective view schematically illustrating an example of a laminated coil component according to a first embodiment.

FIG. 1 is a perspective view schematically illustrating an example of a laminated coil component according to a first embodiment.

Figure 2:
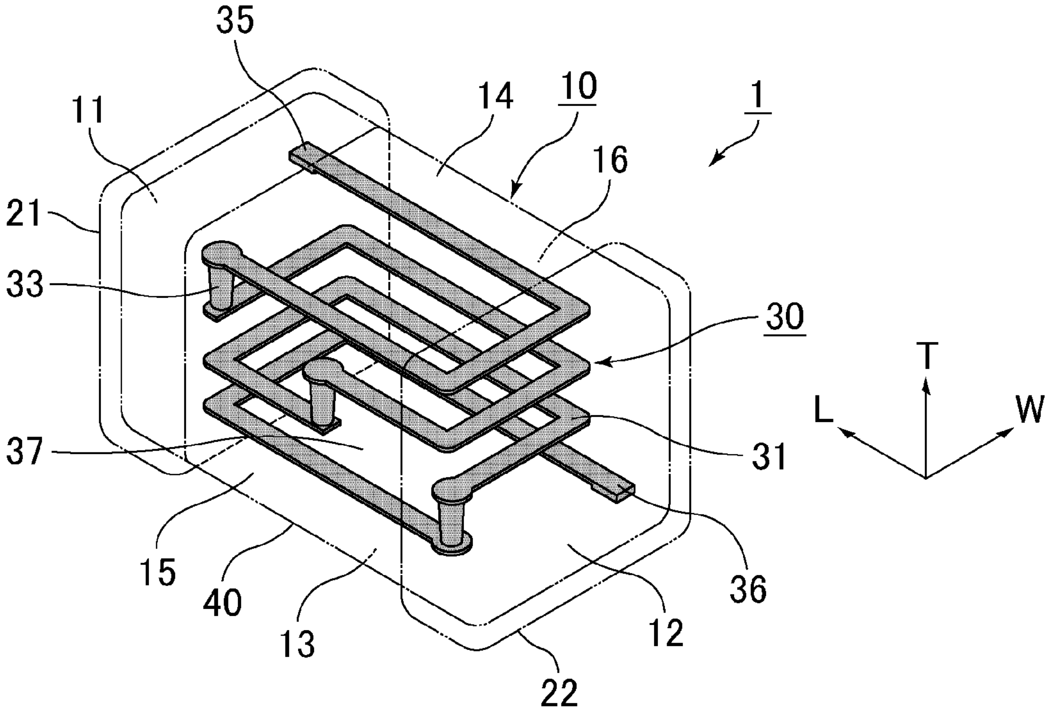
FIG. 2 is a perspective view schematically illustrating an example of a multilayer body constituting the laminated coil component according to the first embodiment.

FIG. 2 is a perspective view schematically illustrating an example of a multilayer body constituting the laminated coil component according to the first embodiment. FIG. 2 schematically illustrates the inside of the laminated coil component in a transparent manner so as to show the structure of a coil included in the laminated coil component.

A laminated coil component 1 illustrated in FIGS. 1 and 2 includes a multilayer body 10, and a first outer electrode 21 and a second outer electrode 22 that are provided on outer surfaces of the multilayer body 10. The multilayer body 10 has a substantially rectangular parallelepiped shape having six surfaces. As the structure of the multilayer body 10 will be described later, a coil 30 is provided in the inside of an insulator portion 40 that is formed by laminating a plurality of insulation layers made of ceramic. Each of the first outer electrode 21 and the second outer electrode 22 is electrically connected with the coil 30.

In the laminated coil component and multilayer body described in the present specification, the direction in which the first outer electrode and the second outer electrode are opposed to each other is defined as the length direction. The direction orthogonal to the length direction is defined as the height direction and the direction orthogonal to the length direction and height direction is defined as the width direction.

FIGS. 1 and 2 illustrate the length direction, width direction, and height direction in the laminated coil component and multilayer body with arrows L direction, W direction, and T direction respectively.

The length direction (L direction), the width direction (W direction), and the height direction (T direction) are orthogonal to each other.

A mounting surface of the laminated coil component 1 is a surface (LW surface) which is parallel to the length direction and the width direction.

The multilayer body 10 illustrated in FIGS. 1 and 2 includes a first end surface 11, a second end surface 12, a first main surface 13, a second main surface 14, a first lateral surface 15, and a second lateral surface 16. The first end surface 11 and the second end surface 12 are opposed to each other in the length direction. The first main surface 13 and the second main surface 14 are opposed to each other in the height direction which is orthogonal to the length direction. The first lateral surface 15 and the second lateral surface 16 are opposed to each other in the width direction which is orthogonal to the length direction and the height direction.

The multilayer body 10 preferably includes rounded corner portions and rounded ridge portions as illustrated in FIGS. 1 and 2. The corner portion is a portion on which three surfaces of the multilayer body 10 intersect with each other and the ridge portion is a portion on which two surfaces of the multilayer body 10 intersect with each other.

As illustrated in FIG. 1, the first outer electrode 21 is disposed in a manner such that the first outer electrode 21 covers the first end surface 11 of the multilayer body 10 and extends from the first end surface 11 to cover a portion of the first main surface 13, a portion of the second main surface 14, a portion of the first lateral surface 15, and a portion of the second lateral surface 16. Also, the second outer electrode 22 is disposed in a manner such that the second outer electrode 22 covers the second end surface 12 of the multilayer body 10 and extends from the second end surface 12 to cover a portion of the first main surface 13, a portion of the second main surface 14, a portion of the first lateral surface 15, and a portion of the second lateral surface 16, as illustrated in FIG. 1.

The first main surface 13 is the mounting surface.

The coil 30 is formed by electrically connecting a plurality of coil conductors 31 with each other, the coil conductors 31 being laminated with a plurality of insulation layers. The plurality of insulation layers are integrated in firing the multilayer body 10 in a manufacturing process, becoming the insulator portion 40.

The lamination direction of the multilayer body 10 in which the plurality of insulation layers and the plurality of coil conductors 31 are laminated goes along the height direction (T direction). Further, the coil axis of the coil 30 goes along the height direction (T direction).

In the present specification, "upper" means a direction following the lamination direction and "lower" means a direction against the lamination direction.

Each coil conductor 31 constituting the coil 30 is a conductor formed in a substantially annular shape (substantially C shape) which is partially missing to have a gap 37. The plurality of coil conductors 31 are laminated so as to overlap with each other with the gaps 37 whose positions are shifted in the winding direction of the coil 30. Each coil conductor 31 normally has the larger line width than the thickness thereof.

The plurality of coil conductors 31 are electrically connected in series with via conductors 33 interposed therebetween, forming the coil 30.

More specifically, the via conductor 33 is provided between two coil conductors 31 which are adjacent to each other in the lamination direction, and each via conductor 33 electrically connects one end of the lower coil conductor 31 and the other end of the upper coil conductor 31.

Here, one end and the other end of the coil conductor 31 respectively mean one end portion and the other end portion in the winding direction of the coil 30.

Figure 3:
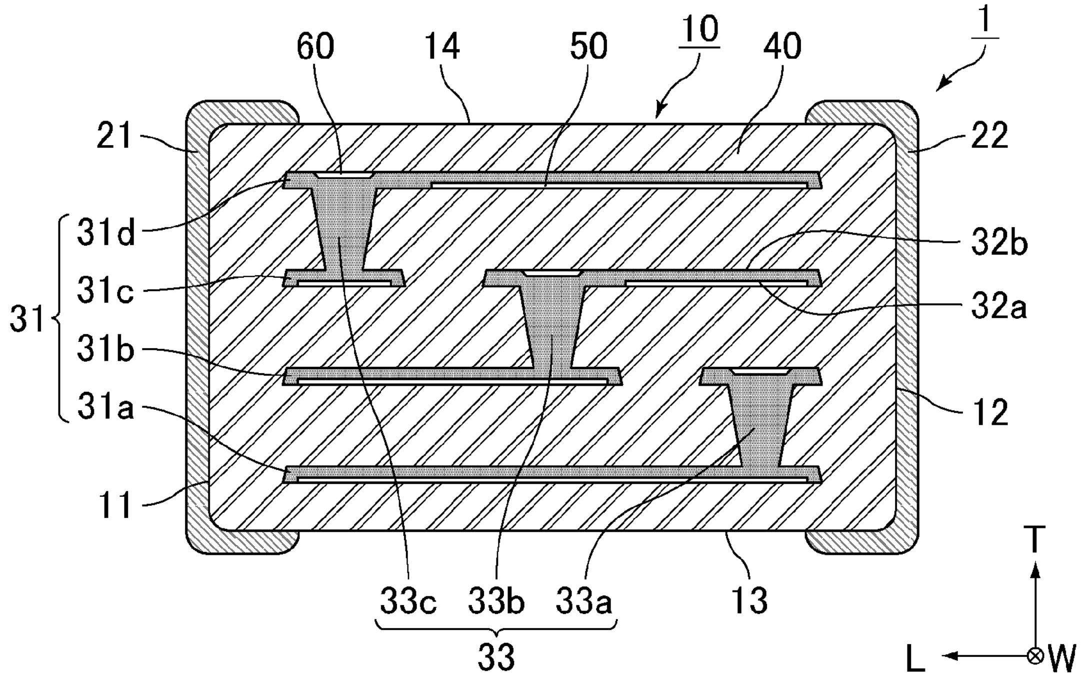
FIG. 3 is an LT sectional view schematically illustrating an example of an internal structure of the laminated coil component according to the first embodiment.

Each via conductor 33 is a substantially columnar conductor extending in the lamination direction and the lateral surface of each via conductor 33 may have a substantially reverse-tapered shape as illustrated in FIG. 3 described later, a substantially tapered shape, or a substantially vertical-columnar shape.

The coil conductor 31 and the first outer electrode 21 are electrically connected with each other at the first end surface 11 and the coil conductor 31 and the second outer electrode 22 are electrically connected with each other at the second end surface 12.

A conductor leading the coil 30 to the first end surface 11 is an extended conductor 35, and a conductor leading the coil 30 to the second end surface 12 is an extended conductor 36.

This laminated coil component 1 has a relation between the length dimension L which is a dimension in the length direction of the multilayer body 10 and the width dimension W which is a dimension in the width direction: L/W>1.

That is, the length dimension L of the multilayer body 10 is larger than the width dimension W.

Not especially limited, but the size of the laminated coil component 1 is preferably the 0402 size, the 0603 size, the 1005 size, or the 1608 size.

FIG. 3 is an LT sectional view schematically illustrating an example of an internal structure of the laminated coil component according to the first embodiment. FIG. 3 is the LT sectional view taken along the A-A line of FIG. 1 and illustrating a portion on which the via conductors are formed.

FIG. 3 shows the coil conductors 31 (31*a*, 31*b*, 31*c*, 31*d*) constituting the coil 30 and the via conductors 33 (33*a*, 33*b*, 33*c*) connecting the coil conductors 31 adjacent to each other. Each of the coil conductors 31*a*, 31*b*, 31*c*, and 31*d* shows one turn of the coil conductor 31.

The maximum thickness of each coil conductor 31 in the lamination direction is preferably from approximately 5 μm to 25 μm inclusive, more preferably from approximately 10 μm to 20 μm inclusive.

The dimension of each via conductor 33 in the lamination direction (the thickness of the insulator portion 40 between two coil conductors 31 which are adjacent to each other in the lamination direction) is preferably from approximately 5 μm to 30 μm inclusive, more preferably from approximately 10 μm to 25 μm inclusive.

Each coil conductor 31 has a first main surface 32*a*, which faces the opposite direction to the lamination direction, that is, faces the lower side, and a second main surface 32*b*, which faces the lamination direction, that is, faces the upper side. The first main surface 32*a* is the main surface on the mounting surface side.

The first main surface 32*a* and second main surface 32*b* of each coil conductor 31 are parallel to the first main surface 13 and second main surface 14 of the multilayer body 10.

Further, FIG. 3 illustrates the structure that includes a void 50 between the first main surface 32*a* of each coil conductor 31 and the insulator portion 40. The existence of the void 50 reduces the contact between the insulator portion 40 and each coil conductor 31, being able to relax the internal stress of the multilayer body 10.

The void 50 is formed on a slightly inner position from the end portions of the coil conductor 31 at a similar pattern to that of the coil conductor 31.

The maximum thickness of the void 50 in the lamination direction is preferably from approximately 2 μm to 15 μm inclusive, more preferably from approximately 4 μm to 6 μm inclusive.

Furthermore, FIG. 3 illustrates the structure that includes a void 60 between the second main surface 32*b* of each coil conductor 31 and the insulator portion 40 (however, only on positions opposed to the via conductors 33).

Figure 4:
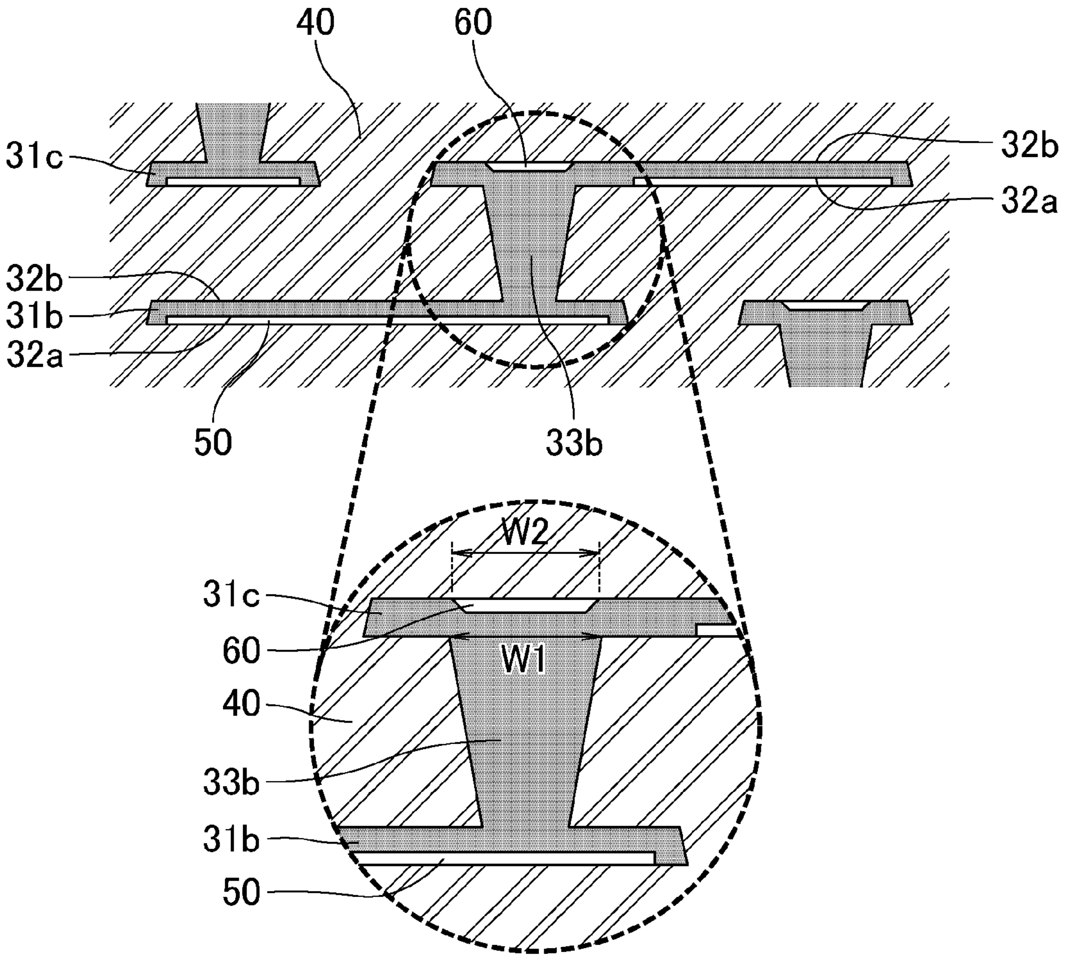
FIG. 4 is an LT sectional view schematically illustrating an example of a first coil conductor and a second coil conductor of the laminated coil component according to the first embodiment.

FIG. 4 is an LT sectional view schematically illustrating an example of a first coil conductor and a second coil conductor of the laminated coil component according to the first embodiment. FIG. 4 is the LT sectional view illustrating a portion on which the via conductors are formed. FIG. 4 also shows a sectional view schematically illustrating a vicinity of a first via conductor in an enlarged manner.

FIG. 4 illustrates the coil conductors 31*b* and 31*c* as examples of a first coil conductor and a second coil conductor according to the present disclosure respectively, and illustrates the via conductor 33*b* as an example of a first via conductor according to the present disclosure. However, the same goes to other two coil conductors 31 that are adjacent to each other in the lamination direction and other via conductors 33 respectively interposed between the coil conductors 31.

As illustrated in FIG. 4, the first coil conductor 31*b* and the second coil conductor 31*c* are adjacent to each other in the lamination direction and are electrically connected with each other in series with the first via conductor 33*b* interposed therebetween. Thus, the first coil conductor 31*b*, the first via conductor 33*b*, and the second coil conductor 31*c* are disposed in this order in the lamination direction.

Accordingly, the second main surface 32*b* of the first coil conductor 31*b* and the first main surface 32*a* of the second coil conductor 31*c* are electrically connected with each other with the first via conductor 33*b* interposed therebetween.

As described above, there is the void 50 between the first main surface 32*a* of the first coil conductor 31*b* and the insulator portion 40, and in a similar manner, there is the void 50 between the first main surface 32*a* of the second coil conductor 31*c* and the insulator portion 40.

Further, the second coil conductor 31*c* has the second main surface 32*b* on which the void 60 exists in a manner to be interposed between this second main surface 32*b* and the insulator portion 40.

The existence of the void 60 further reduces the contact between the insulator portion 40 and each coil conductor 31, being able to further relax the internal stress of the multilayer body 10.

If the void 60 is provided in a wide range as the void 50, the strength of the multilayer body 10 may be insufficient. However, the void 60 locally exists on a position opposed to the first via conductor 33*b*.

Accordingly, the internal stress can be further relaxed while securing required strength of the multilayer body 10.

Furthermore, the void 60 locally existing on the position opposed to the first via conductor 33*b* can be formed without adding a step for forming the void 60 as described later, so the laminated coil component 1 can be produced with high productivity.

As illustrated in the enlarged view of FIG. 4, a ratio of the width W2 of the void 60 in the direction orthogonal to the lamination direction (the same direction as the width W1 measuring direction, for example, the length direction (L direction)) with respect to the width W1 of the first via conductor 33*b* in the same direction (for example, the length direction (L direction)) is preferably from approximately 0.5 to 1.0 inclusive, more preferably from approximately 0.7 to 1.0 inclusive.

Here, when the width W1 of the first via conductor 33*b* is not constant in the lamination direction, the maximum width of the first via conductor 33*b* is the width W1.

The maximum thickness of the void 60, which is on the second main surface 32*b* of the second coil conductor 31*c*, in the lamination direction is preferably from approximately 1 μm to 15 μm inclusive, more preferably from approximately 5 μm to 10 μm inclusive.

Figure 5:
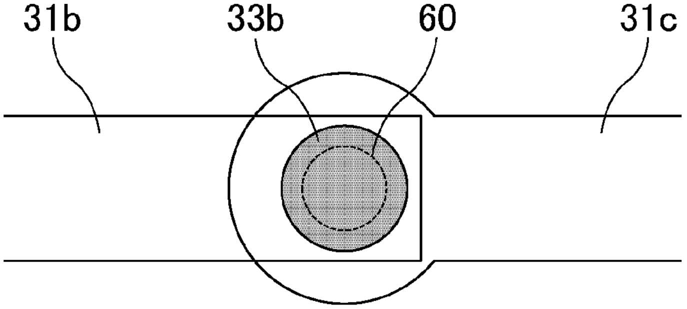
FIG. 5 is a plan view schematically illustrating an example of a via conductor portion of the laminated coil component according to the first embodiment.

FIG. 5 is a plan view schematically illustrating an example of a via conductor portion of the laminated coil component according to the first embodiment.

As illustrated in FIG. 5, the void 60 may be within a disposing region of the first via conductor 33*b* in plan view in the lamination direction.

The ratio of the area of the void 60 with respect to the area of the first via conductor 33*b* in plan view in the lamination direction is preferably from approximately 25% to 100% inclusive, more preferably from approximately 49% to 100% inclusive.

Examples of the favorable planar shape of the first via conductor 33*b* (the shape in plan view in the lamination direction) include an approximately n polygon (n is an integer which is 3 or greater, for example, 3 to 8, preferably 4 to 6) and a shape having a curve such as substantially circular, elliptic, and oval shapes.

The void 60 may have the substantially same shape as that of the first via conductor 33*b* in plan view in the lamination direction.

The pore area ratio of the coil 30 is preferably from approximately 5% to 15% inclusive, more preferably from approximately 6% to 12% inclusive. The voids 50 and 60 can be more securely formed by thus setting the pore area ratio higher than usual. This is because the coil 30 having the high pore area ratio can be formed with a high-shrinkage conductor paste.

The ratio of the width W2 of the void 60 with respect to the width W1 of the first via conductor 33*b* and the pore area ratio of the coil 30, which are described above, can be measured by the method described below.

A sample is first stood vertically and the area around the sample is hardened with resin. At this time, the LT surfaces (lateral surfaces) are exposed.

Then, polishing is performed with a polishing machine in the W direction of the sample up to the depth at which a via conductor (via coupling portion) is exposed.

Subsequently, a pore area ratio and a width ratio are calculated by respectively following (1) and (2) below.

(1) A section on which the coil conductor is exposed is processed with a focused ion beam (FIB processing) so as to obtain a section for SEM observation. A SEM picture is taken at a substantially central portion of the via conductor (the range is 50 μm×50 μm) and the obtained SEM picture is analyzed with image analysis software to calculate the pore area ratio of the coil. Here, the FIB processing employs an FIB processing device: SMI3050R made by SII Nano Technology Inc., for example.

(2) A SEM picture of the via conductor is taken, and dimensions of the width of a first via conductor and the width of a void are obtained based on the picture to calculate the ratio between the dimensions.

Figure 6:
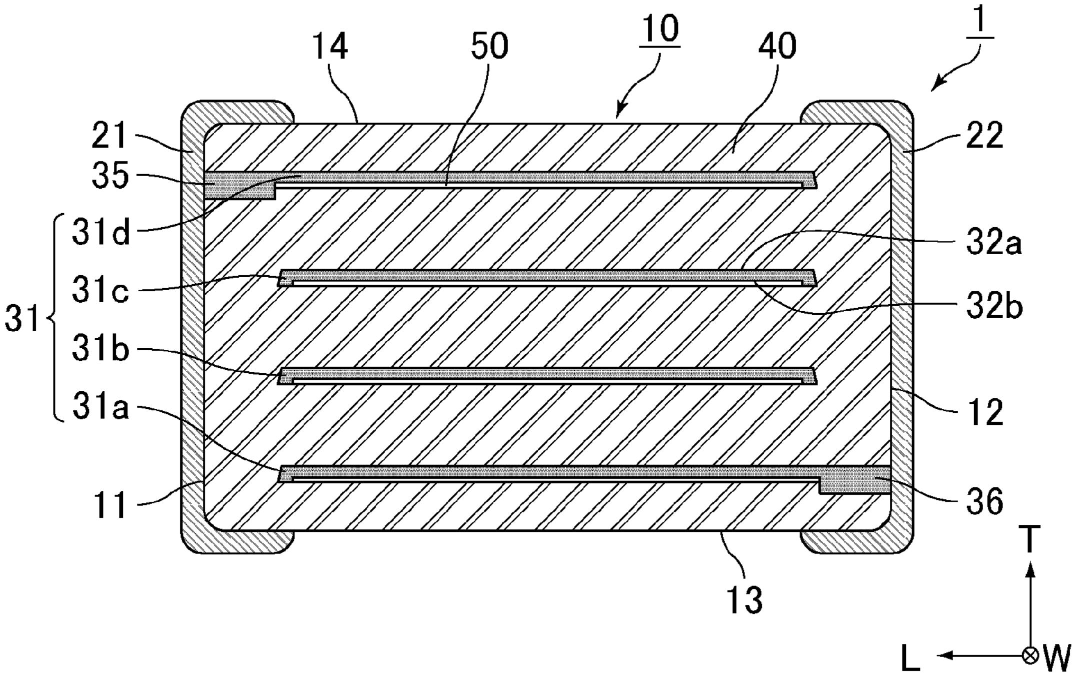
FIG. 6 is another LT sectional view schematically illustrating an example of an internal structure of the laminated coil component according to the first embodiment.

FIG. 6 is another LT sectional view schematically illustrating an example of an internal structure of the laminated coil component according to the first embodiment. FIG. 6 is the LT sectional view taken along the B-B line of FIG. 1 and illustrating a portion on which the extended conductors are formed.

FIG. 6 illustrates the structure in which the thickness of the extended conductor 35 leading the coil 30 to the first end surface 11 and the thickness of the extended conductor 36 leading the coil 30 to the second end surface 12 are greater than the thickness of the coil conductor 31.

This structure improves the sealing property of the laminated coil component 1.

An example of a method for manufacturing the laminated coil component according to the present embodiment, especially, a method for manufacturing a multilayer body is now be described.

The method described below is a method for producing a multilayer body based on a printed sheet lamination method which is a combined method of printing and sheet lamination.

In the printed sheet lamination method, a plurality of coil sheets that are obtained by applying a conductor paste and a ceramic paste to insulator sheets are laminated to form a coil extending in the lamination direction of a multilayer body.

The printed sheet lamination method is different from a printing lamination method in which a coil conductor extending in the lamination direction of a multilayer body is formed only by applying and laminating a conductor paste and a ceramic paste.

Further, the printed sheet lamination method is different from a method for laminating a plurality of sheets that are produced to have via conductors therein formed by laser-drilling the sheets and filling the obtained holes with a conductor paste.

In production by the printed sheet lamination method and the printing lamination method, the thickness of an internal conductor can be increased. If the internal conductor has the greater thickness, the volume of the internal conductor is increased and accordingly, shrinkage in firing is increased. Consequently, the void 60 can be further securely formed on a position opposed to the via conductor 33 as described above.

On the other hand, productivity in the printing lamination method is inferior to that in the printed sheet lamination method because a multilayer body is produced by printing each layer of the multilayer body and accordingly, drying takes time in the printing lamination method.

Thus, the present disclosure is favorable especially for producing a laminated coil component by the printed sheet lamination method.

FIGS. 7 to 10 are plan views schematically illustrating an example of a method for producing a multilayer body by a printed sheet lamination method according to the first embodiment.

FIGS. 7 to 10 illustrate layer structures of respective coil sheets constituting a multilayer body that is produced by the printed sheet lamination method.

In the printed sheet lamination method, a conductor paste and a ceramic paste are applied to an insulator sheet, where the insulator sheet illustrated on the top of each drawing is used as a base, to sequentially obtain states in the drawing downward.

The insulator sheet and the ceramic paste are materials which are to be an insulator portion through firing.

FIGS. 7 to 10 merely illustrate upper surface states of a layer after printing, and do not illustrate that the layers shown in FIGS. 7 to 10 are separately produced and laminated.

Figure 11:
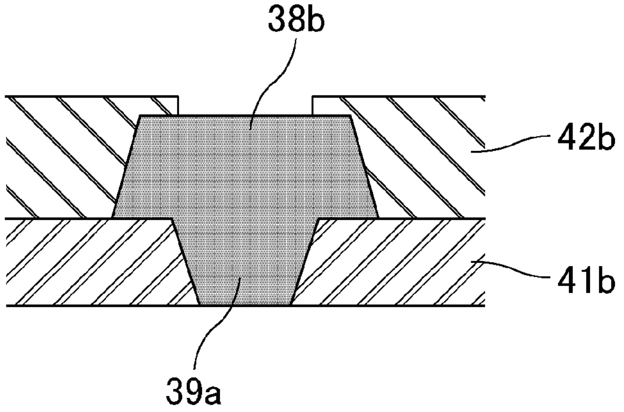
FIG. 11 is a sectional view schematically illustrating an example of a layer structure of coil sheets after application of a ceramic paste.

FIG. 11 is a sectional view schematically illustrating an example of a layer structure of coil sheets after application of a ceramic paste.

First, a ceramic paste, an insulator sheet (green sheet), a conductor paste, and a resin paste are prepared as materials.

A ferrite paste is preferably used as the ceramic paste. As the ferrite paste, the following ferrite material is preferably used: a ferrite material containing Fe from approximately 40 mol % to 49.5 mol % inclusive in terms of $Fe_2O_3$, Zn from approximately 5 mol % to 35 mol % inclusive in terms of ZnO, Cu from approximately 4 mol % to 12 mol % inclusive in terms of CuO, and Ni from approximately 8 mol % to 42 mol % inclusive in terms of NiO. Micro additives such as Bi, Sn, Mn, and Co (including inevitable impurities) may be contained in the above-mentioned materials.

The following method, for example, is employed as a method for producing a ferrite paste.

$Fe_2O_3$, ZnO, CuO, NiO, and, if required, additives are weighed in a predetermined composition, and these are put in a ball mill with pure water, dispersant, and PSZ media and are wet-mixed and -crushed. Subsequently, the crushed mixture is discharged, evaporated, and dried, and then calcined for approximately two to three hours inclusive at the temperature from approximately 700° C. to 800° C. inclusive to obtain calcined powder.

After predetermined amounts of solvent (for example, ketone solvent), resin (for example, polyvinyl acetal), and plasticizer (for example, alkyd-based plasticizer) are put into the calcined powder and are kneaded with a planetary mixer, the kneaded powder is dispersed with a three-roll mill to produce a ferrite paste.

Further, an insulator sheet is produced from the obtained ceramic paste.

Specifically, the obtained calcined powder (the ferrite paste), organic binder such as polyvinyl butyral resin, and organic solvent such as ethanol and toluene are put in a ball mill with the PSZ media and are wet-mixed and -crushed to produce slurry. Subsequently, the obtained slurry is shaped in a sheet form having predetermined thickness by the doctor blade method or the like and is then punched out in a predetermined shape, thus producing an insulator sheet.

The insulator sheet is an example of an insulation layer of the laminated coil component according to the present disclosure.

The thickness of the insulator sheet is preferably from approximately 10 μm to 30 μm inclusive.

The shrinkage rate of the insulator sheet in firing is preferably from approximately 5% to 25% inclusive, more preferably from approximately 10% to 20% inclusive.

The ceramic paste is also used for forming an insulation layer in a region in which a conductor paste layer is not formed, as described later.

Accordingly, the shrinkage rate of the insulation layer in firing is substantially the same as the shrinkage rate of the insulator sheet in firing.

A paste containing silver is preferably used as a conductor paste which is a conductive material.

The following method, for example, is employed as a method for producing a conductor paste.

Silver powder is prepared, then predetermined amounts of solvent (for example, eugenol), resin (for example, ethyl cellulose), and dispersant are put into the silver powder and are kneaded with a planetary mixer, and the kneaded powder is dispersed with a three-roll mill, thus producing a conductor paste.

In preparation of the conductor paste, the shrinkage rate of the conductor paste layer in firing is set to be higher than the shrinkage rate of the insulator sheet in firing by adjusting pigment volume concentration (PVC). The PVC is the concentration of the volume of a conductive material (typically, silver powder) with respect to a total volume of the volumes of the conductive material and resin components in the conductor paste.

This enables a via coupling portion to further shrink in firing compared to ceramic, thus selectively forming the void 60 on the via coupling portion.

Here, the via coupling portion means a conductor portion that is composed of a via conductor and a coil conductor portion coupled (joined) to the via conductor.

The shrinkage rate of the conductor paste layer in firing is preferably from approximately 20% to 40% inclusive, more preferably from approximately 25% to 35% inclusive.

The difference between the shrinkage rate of the conductor paste layer in firing and the shrinkage rate of the insulator sheet in firing is preferably from approximately 5% to 30% inclusive, more preferably from approximately 15% to 20% inclusive.

In a similar manner, the shrinkage rate of the conductor paste layer in firing is higher than the shrinkage rate of the insulation layer, which is formed in a region in which the conductor paste layer is not formed, in firing.

Accordingly, the void 60 can be more effectively formed on the via coupling portion.

Here, the above-described shrinkage rate can be obtained in a manner such that a conductive paste or a ceramic paste is applied to, for example, a polyethylene terephthalate (PET) film and dried, and then cut out in the size of approximately 5 mm×5 mm, and change in the sample dimension is measured with a thermomechanical analyzer (TMA) which is set at the same heating condition as that in firing.

The resin paste is used for forming a resin paste layer between the insulator sheet and the conductor paste layer. The void 50 is formed by burning out the resin paste layer after firing.

The following method, for example, is employed as a method for producing a resin paste.

A resin paste is produced by incorporating resin (for example, acrylic resin), which is to burnt out in firing, in a solvent (for example, isophorone).

Printing lamination proceeds from the top to the bottom in the drawings, so the description will be provided following the procedure.

Figure 7:
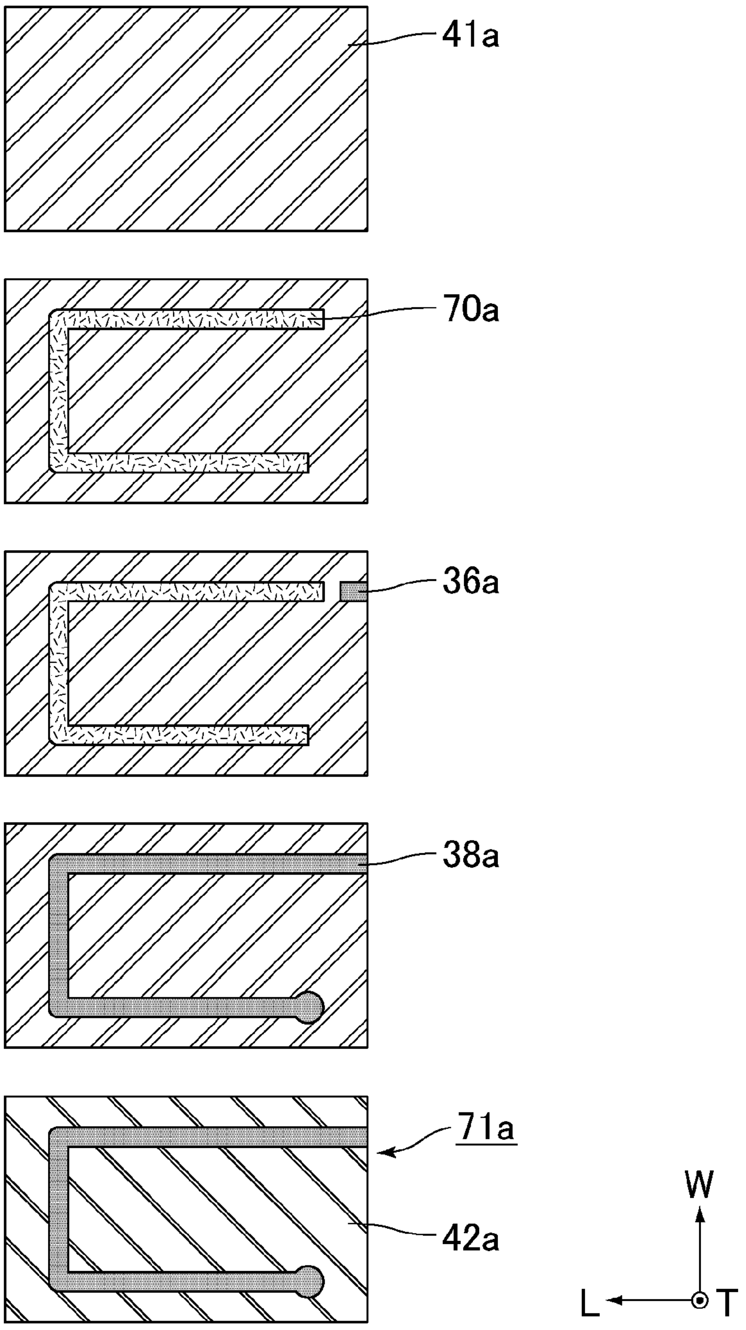
FIG. 7 is a plan view schematically illustrating an example of a method for producing a multilayer body by a printed sheet lamination method according to the first embodiment.

An insulator sheet 41*a* is first prepared as illustrated in the top drawing of FIG. 7.

Then, a resin paste is applied to the insulator sheet 41*a* to form a resin paste layer 70*a* as the pattern illustrated in the second drawing from the top in FIG. 7.

It is preferable to set the pattern of the resin paste layer 70*a* to be the substantially same as the pattern of a conductor paste layer 38*a* for the coil conductor 31, which is to be formed later, and set the line width of the resin paste layer 70*a* to be slightly smaller than the line width of the conductor paste layer 38*a* for the coil conductor 31.

Subsequently, a conductor paste is applied to form a conductor paste layer 36*a* which is to be a lower layer portion of the extended conductor 36, as the pattern illustrated in the third drawing from the top in FIG. 7.

After that, a conductor paste is applied in a manner to overlap with the resin paste layer 70*a* and the conductor paste layer 36*a* so as to form the conductor paste layer 38*a* which is to be the coil conductor 31 (31*a*) and an upper layer portion of the extended conductor 36, as the pattern illustrated in the fourth drawing from the top in FIG. 7.

The thickness of the extended conductor 36 can be increased through this step (see FIG. 6). The increased thickness of the extended conductor 36 improves the sealing property, being able to suppress an occurrence of failures such as infiltration of plating liquid from an interface between the insulator portion 40 and the extended conductor 36.

The conductor paste layer 38*a* is formed so that the conductor paste layer 38*a* covers the resin paste layer 70*a*.

Subsequently, a ceramic paste is applied to a region, in which the conductor paste layer 38*a* is not formed, to form an insulation layer 42*a*. Thus, a coil sheet 71*a* is formed in which the insulator sheet 41*a*, the resin paste layer 70*a*, the conductor paste layer 38*a*, and the insulation layer 42*a* are laminated in this order.

The thickness of the insulation layer 42*a* is set to be the substantially same as the thickness of the conductor paste layer 38*a*. Further, the insulation layer 42*a* is printed so as to partially overlap with an end portion of the conductor paste layer 38*a*. This printed layer is the insulator portion 40 surrounding the coil conductor 31 (31*a*).

The pattern illustrated in the fifth drawing from the top in FIG. 7 shows the upper surface after forming the insulation layer 42*a*.

Figure 8:
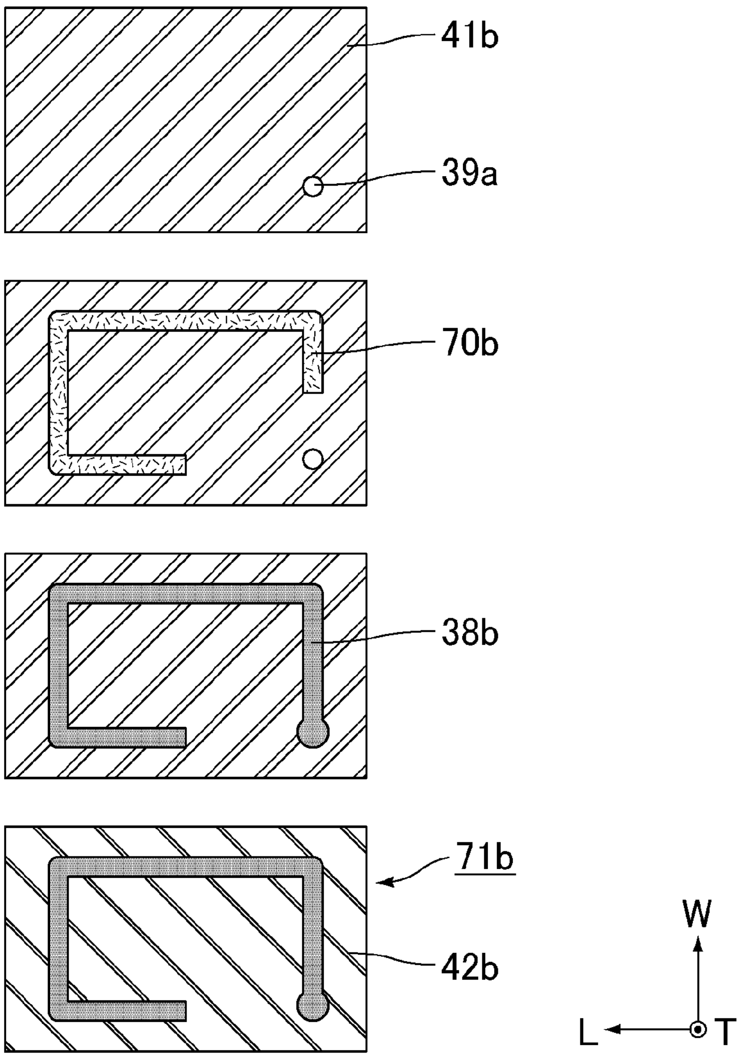
FIG. 8 is a plan view schematically illustrating the example of the method for producing the multilayer body by the printed sheet lamination method according to the first embodiment.

Next, an insulator sheet 41*b* on which a via hole 39*a* is formed is prepared as illustrated in the top drawing of FIG. 8. The via hole 39*a* is formed by irradiating a portion, which is to be connected with the conductor paste layer 38*a* formed on the coil sheet 71*a*, of the insulator sheet 41*b* with laser.

Then, a resin paste is applied to the insulator sheet 41*b* to form a resin paste layer 70*b* as the pattern illustrated in the second drawing from the top in FIG. 8.

It is preferable to set the pattern of the resin paste layer 70*b* to be the substantially same as the pattern of a conductor paste layer 38*b* for the coil conductor 31, which is to be formed later, and set the line width of the resin paste layer 70*b* to be slightly smaller than the line width of the conductor paste layer 38*b* for the coil conductor 31.

Here, the resin paste layer 70*b* is formed not to cover the via hole 39*a*.

After that, a conductor paste is applied in a manner to overlap with the resin paste layer 70*b* and the via hole 39*a* so as to form the conductor paste layer 38*b* which is to be the coil conductor 31 (31*b*), as the pattern illustrated in the third drawing from the top in FIG. 8.

The via hole 39*a* is filled with the conductor paste so as to electrically connect the coil conductor 31 (31*b*) with the coil conductor 31 (31*a*) of the lower layer with the via conductor 33 (33*a*) interposed therebetween.

The conductor paste layer 38*b* is formed so that the conductor paste layer 38*b* covers the resin paste layer 70*b*.

Subsequently, a ceramic paste is applied to a region, in which the conductor paste layer 38*b* is not formed, to form an insulation layer 42*b*. Thus, a coil sheet 71*b* is formed in which the insulator sheet 41*b*, the resin paste layer 70*b*, the conductor paste layer 38*b*, and the insulation layer 42*b* are laminated in this order.

The thickness of the insulation layer 42*b* is set to be the substantially same as the thickness of the conductor paste layer 38*b*, as illustrated in FIG. 11. Further, the insulation layer 42*b* is printed so as to partially overlap with an end portion of the conductor paste layer 38*b*. This printed layer is the insulator portion 40 surrounding the coil conductor 31 (31*b*).

The pattern illustrated in the fourth drawing from the top in FIG. 8 shows the upper surface after forming the insulation layer 42*b*.

Figure 9:
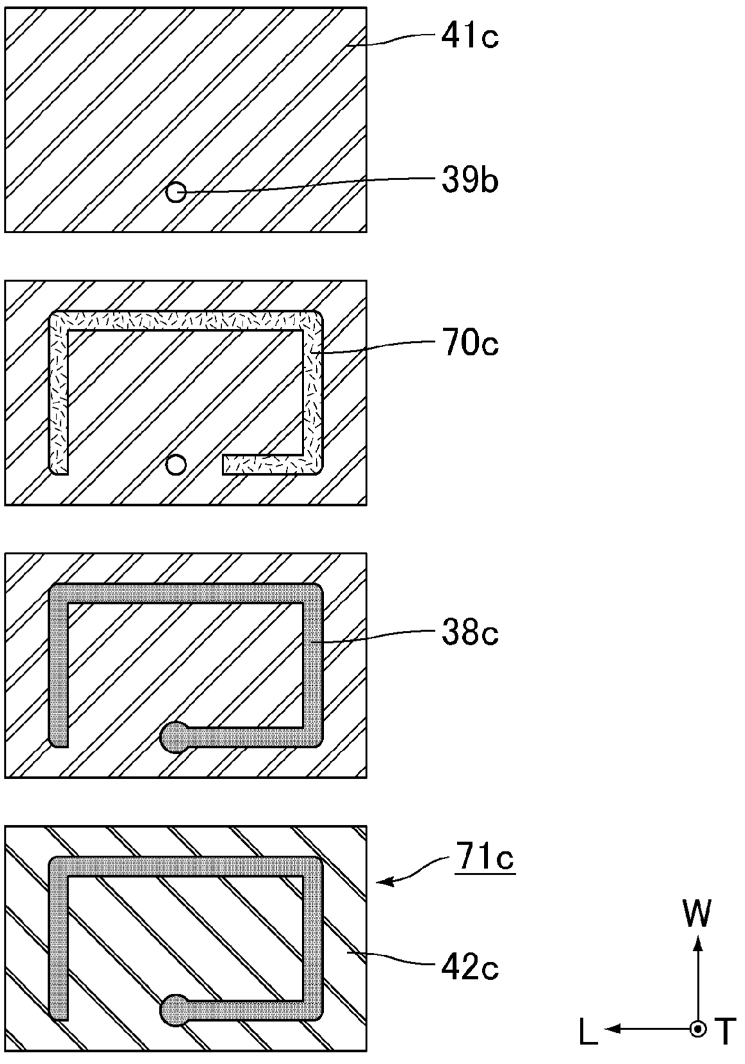
FIG. 9 is a plan view schematically illustrating the example of the method for producing the multilayer body by the printed sheet lamination method according to the first embodiment.
Figure 10:
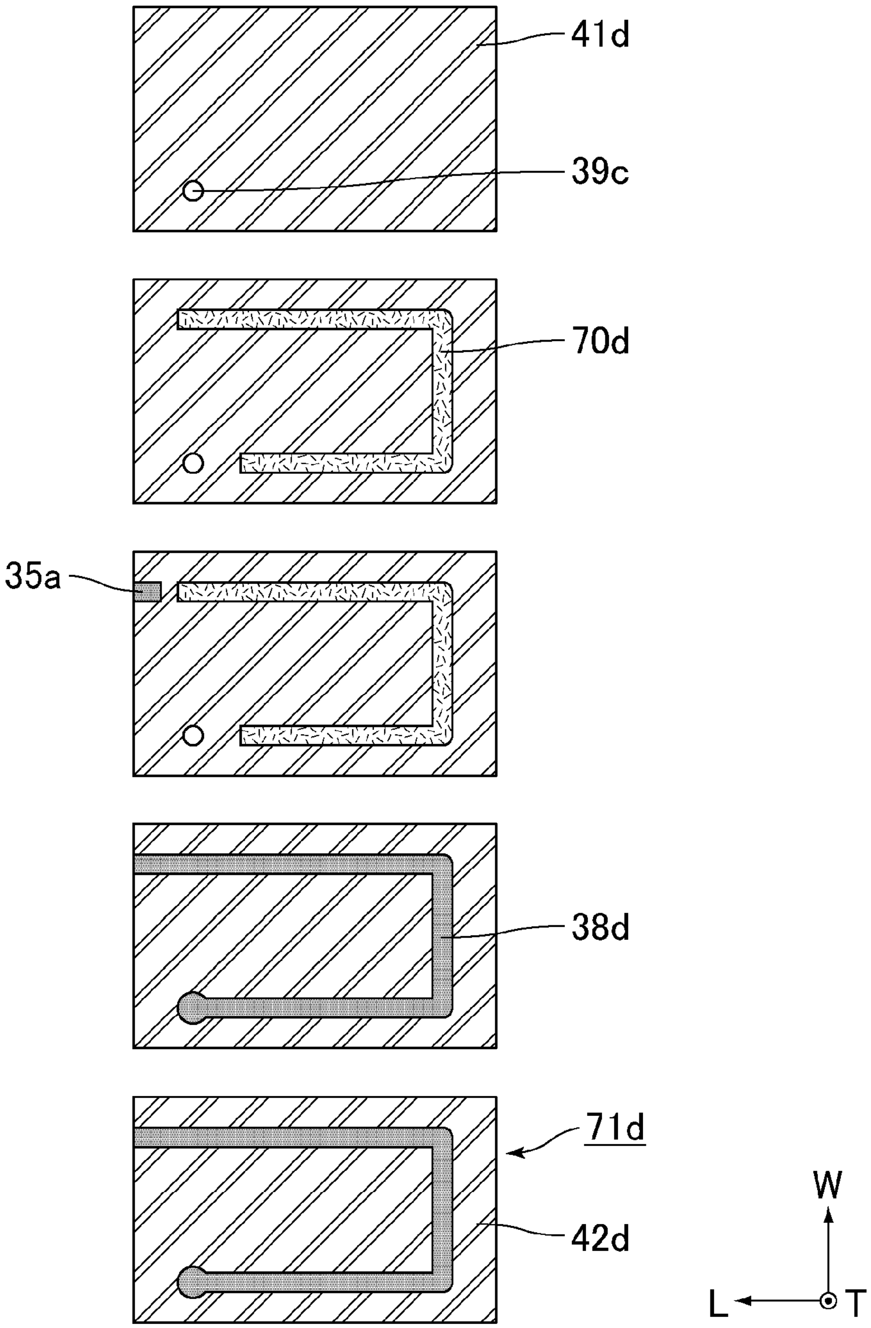
FIG. 10 is a plan view schematically illustrating the example of the method for producing the multilayer body by the printed sheet lamination method according to the first embodiment.

A coil sheet 71*c* and a coil sheet 71*d* are formed in a similar manner. In the coil sheet 71*c*, an insulator sheet 41*c* on which a via hole 39*b* is formed, a resin paste layer 70*c*, a conductor paste layer 38*c*, and an insulation layer 42*c* are laminated in this order, as illustrated in FIG. 9. In the coil sheet 71*d*, an insulator sheet 41*d* on which a via hole 39*c* is formed, a resin paste layer 70*d*, a conductor paste layer 35*a* which is to be a lower layer portion of the extended conductor 35, a conductor paste layer 38*d*, and an insulation layer 42*d* are laminated in this order, as illustrated in FIG. 10.

Then, the plurality of obtained coil sheets are laminated to produce an unfired multilayer body.

More specifically, the produced coil sheets 71*a*, 71*b*, 71*c*, and 71*d* are first laminated in a predetermined order, where laminated in this order in this example. Then, the predetermined number of insulator sheets (unprinted sheets) are laminated on the top and bottom of the laminated coil sheets, and the laminated sheets are subjected to warm isostatic press (WIP) processing on the condition that a temperature is from approximately 70° C. to 90° C. inclusive and pressure is from approximately 60 MPa to 100 MPa inclusive. Consequently, an assembly in which many elements having the above-described patterns are provided on one surface (a multilayer body block) is obtained.

The case is described in which a ceramic paste is applied to a region, on which a conductor paste layer is not formed, to form an insulation layer, but this step for forming an insulation layer may be omitted.

However, it is preferable to form an insulation layer around a conductor paste layer for increasing the thickness of a coil conductor. If there is not an insulation layer around a conductor paste layer, the conductor paste layer may be largely compressed and deformed in the WIP processing and the thickness of the coil conductor may be decreased.

Subsequently, the multilayer body block is cut with a dicer or the like to obtain divided elements.

The element corresponds to a single laminated coil component.

Then, the unfired multilayer body is fired to produce a fired multilayer body.

More specifically, an element is fired at a temperature from approximately 900° C. to 920° C. inclusive for approximately one to four hours inclusive to obtain a fired multilayer body.

The insulator sheets and the insulation layers are integrated through the firing and thus, the insulator portion is formed.

Also, the resin paste layer is burnt out and a void is thus formed between the insulator portion and the first main surface of the coil conductor.

Further, the conductor paste layer more largely shrinks than the insulator sheet and the insulation layer in firing, so a void is locally formed on a position that is between the second main surface of the coil conductor and the insulator portion and is opposed to the via conductor. That is, the void is formed without requiring a dedicated step for forming a void.

Next, barrel processing is conducted in a manner such that the fired multilayer body is put in a rotary barrel machine together with media and rotated. Accordingly, corners and ridges of an element are shaved to be rounded. The barrel processing may be conducted with respect to an unfired element or to a fired multilayer body. Also, either of dry barrel processing or wet barrel processing may be employed.

The barrel processing may be conducted as elements are rubbed on each other or the barrel processing may be conducted with media.

Then, an outer electrode is formed on an outer surface of the fired multilayer body.

More specifically, a conductive paste containing metal (for example, silver) and glass is first applied to an end surface on which the coil of the fired multilayer body is led out, and baked at a temperature from approximately 800° C. to 820° C. inclusive so as to form a base electrode.

Subsequently, electrolytic plating is performed to sequentially form an Ni film and an Sn film on the base electrode, forming a first outer electrode and a second outer electrode. Thus, the laminated coil component can be obtained.

Each of the thickness of the Ni film and the thickness of the Sn film is approximately 3 μm, for example.

Thus, the laminated coil component illustrated in FIG. 1 is produced.

The size of the multilayer body is L=approximately 1.6 mm, W=approximately 0.8 mm, and T=approximately 0.8 mm, for example.

Second Embodiment

A second embodiment will describe an aspect of a structure in which each coil conductor includes a plurality of coil conductors which are electrically connected in parallel (double pattern), being different from the first embodiment (single pattern).

Figure 12:
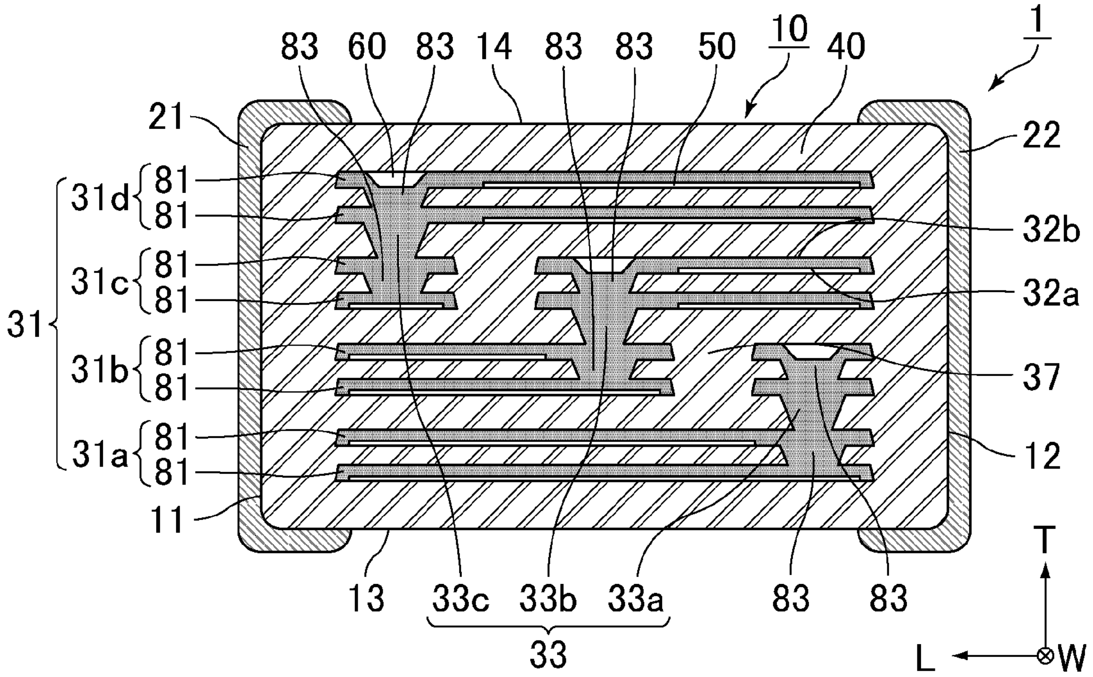
FIG. 12 is an LT sectional view schematically illustrating an example of an internal structure of a laminated coil component according to a second embodiment.

FIG. 12 is an LT sectional view schematically illustrating an example of an internal structure of a laminated coil component according to the second embodiment. FIG. 12 is the LT sectional view illustrating a portion on which via conductors are formed.

In the present embodiment, each of a plurality of coil conductors 31, electrically connected in series with the via conductors 33 interposed therebetween, includes two coil conductors 81 which are electrically connected in parallel with via conductors 83 interposed therebetween (hereinafter, the coil conductors 81 are referred to as parallel connection coils).

This structure can reduce DC resistance of the coil 30 and accordingly, the laminated coil component is suitable for in-vehicle use and the like requiring large current.

Each parallel connection coil 81 constituting the coil conductor 31 is a conductor formed in a substantially annular shape (substantially C shape) which is partially missing to have the gap 37. Two parallel connection coils 81 constituting one coil conductor 31 mutually have the substantially same planar shapes and are laminated so as to overlap with each other, where the positions of the gaps 37 are substantially accorded with each other in the winding direction of the coil 30. Each parallel connection coil 81 normally has the larger line width than the thickness thereof.

The two parallel connection coils 81 are electrically connected in parallel with the plurality of via conductors 83 interposed therebetween, forming each coil conductor 31.

More specifically, two via conductors 83 are provided between two parallel connection coils 81 that are adjacent to each other in the lamination direction. One via conductor 83 electrically connects one end of the lower parallel connection coil 81 and one end of the upper parallel connection coil 81, and the other via conductor 83 electrically connects the other end of the lower parallel connection coil 81 and the other end of the upper parallel connection coil 81.

Each via conductor 83 is a substantially columnar conductor extending in the lamination direction and the lateral surface of each via conductor 83 may have a substantially reverse-tapered shape as illustrated in FIG. 12, a substantially tapered shape, or a substantially vertical-columnar shape.

Here, the number of via conductors 83 which connect two parallel connection coils 81 may be three or greater.

FIG. 12 shows the coil conductors 31 (31*a*, 31*b*, 31*c*, 31*d*) constituting the coil 30, the via conductors 33 (33*a*, 33*b*, 33*c*) connecting the coil conductors 31 adjacent to each other, the parallel connection coils 81 constituting each coil conductor 31, and the via conductors 83 connecting two parallel connection coils 81 constituting one coil conductor 31. Each of the coil conductors 31*a*, 31*b*, 31*c*, and 31*d* shows one turn of the coil conductor 31.

The maximum thickness of each parallel connection coil 81 in the lamination direction is preferably from approximately 8 μm to 28 μm inclusive, more preferably from approximately 13 μm to 23 μm inclusive.

The dimension of each via conductor 83 in the lamination direction (the thickness of the insulator portion 40 between two parallel connection coils 81 which are adjacent to each other in the lamination direction) is preferably from approximately 5 μm to 30 μm inclusive, more preferably from approximately 10 μm to 25 μm inclusive.

Each parallel connection coil 81 has the first main surface 32*a*, which faces the opposite direction to the lamination direction, that is, faces the lower side, and the second main surface 32*b*, which faces the lamination direction, that is, faces the upper side. The first main surface 32*a* is the main surface on the mounting surface side.

The first main surface 32*a* and second main surface 32*b* of each parallel connection coil 81 are parallel to the first main surface 13 and second main surface 14 of the multilayer body 10.

Further, FIG. 12 illustrates the structure that includes the void 50 between the first main surface 32*a* of each parallel connection coil 81 and the insulator portion 40, as is the case with the first embodiment.

This structure can effectively relax the internal stress of the multilayer body 10 also in the present embodiment.

It is preferable to provide the voids 50 on the first main surfaces 32*a* of all parallel connection coils 81 as illustrated in FIG. 12 so as to especially effectively relax the internal stress of the multilayer body 10. However, the void 50 may be provided between the first main surface 32*a* of at least one parallel connection coil 81 of each coil conductor 31 and the insulator portion 40.

Furthermore, FIG. 12 illustrates the structure that includes the void 60 between the second main surface 32*b* of each coil conductor 31 and the insulator portion 40 (however, only on positions opposed to the via conductors 33).

Figure 13:
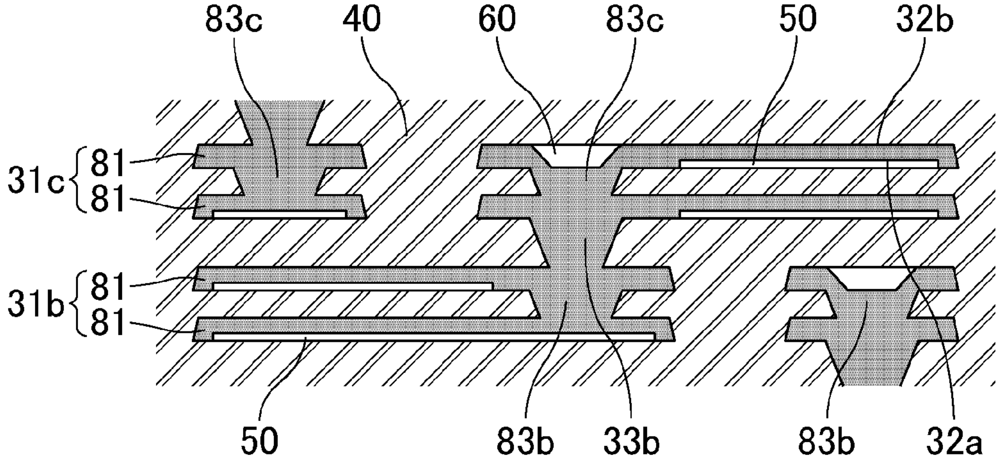
FIG. 13 is an LT sectional view schematically illustrating an example of a first coil conductor and a second coil conductor of the laminated coil component according to the second embodiment.

FIG. 13 is an LT sectional view schematically illustrating an example of a first coil conductor and a second coil conductor of the laminated coil component according to the second embodiment. FIG. 13 is the LT sectional view illustrating a portion on which the via conductors are formed.

FIG. 13 illustrates the coil conductors 31*b* and 31*c* as examples of a first coil conductor and a second coil conductor according to the present disclosure respectively, and illustrates the via conductor 33*b* as an example of a first via conductor according to the present disclosure. However, the same goes to other two coil conductors 31 that are adjacent to each other in the lamination direction and other via conductors 33 respectively interposed between the coil conductors 31.

As illustrated in FIG. 13, as is the case with the first embodiment, the first coil conductor 31*b* and the second coil conductor 31*c* are adjacent to each other in the lamination direction and are electrically connected with each other in series with the first via conductor 33*b* interposed therebetween. Thus, the first coil conductor 31*b*, the first via conductor 33*b*, and the second coil conductor 31*c* are disposed in this order in the lamination direction.

On the other hand, the second coil conductor 31*c* includes two parallel connection coils (coil conductors) 81 that are electrically connected in parallel with a plurality of second via conductors 83*c* interposed therebetween.

More specifically, the first main surface 32*a* of the upper parallel connection coil 81 and the second main surface 32*b* of the lower parallel connection coil 81 are electrically connected with each other with two second via conductors 83*c* interposed therebetween.

Further, the first coil conductor 31*b* includes two parallel connection coils (coil conductors) 81 that are electrically connected in parallel with a plurality of third via conductors 83*b* interposed therebetween.

More specifically, the first main surface 32*a* of the upper parallel connection coil 81 and the second main surface 32*b* of the lower parallel connection coil 81 are electrically connected with each other with two third via conductors 83*b* interposed therebetween.

As described above, there is the void 50 between the first main surface 32*a* of each parallel connection coil 81 and the insulator portion 40.

Further, the second coil conductor 31*c* has the second main surface 32*b* on which the void 60 exists in a manner to be interposed between this second main surface 32*b* and the insulator portion 40, and the void 60 locally exists on a position opposed to the first via conductor 33*b*, as is the case with the first embodiment.

Accordingly, the internal stress can be further relaxed while securing required strength of the multilayer body 10, as is the case with the first embodiment.

Furthermore, the void 60 can be formed without adding a step for forming the void 60, so the laminated coil component 1 can be produced with high productivity also in the present embodiment.

In the present embodiment, the volume of a via coupling portion can be increased and shrinkage of the via coupling portion in firing can be increased compared to the first embodiment. Therefore, the void 60 can be more effectively formed.

Here, the second main surface 32*b* of the second coil conductor 31*c* on which the void 60 exists in a manner to be interposed between this second main surface 32*b* and the insulator portion 40 is the second main surface 32*b* of the upper parallel connection coil 81 of the two parallel connection coils 81 constituting the second coil conductor 31*c* in this structure.

Figure 14:
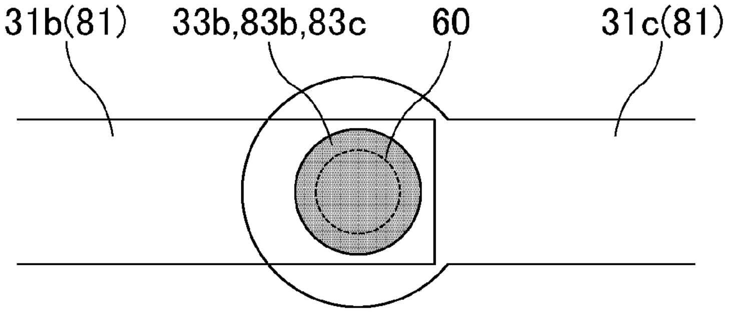
FIG. 14 is a plan view schematically illustrating an example of a via conductor portion of the laminated coil component according to the second embodiment.

FIG. 14 is a plan view schematically illustrating an example of a via conductor portion of the laminated coil component according to the second embodiment.

As illustrated in FIG. 14, the second via conductor 83*c* overlaps with the first via conductor 33*b* in plan view in the lamination direction and the third via conductor 83*b* overlaps with the first via conductor 33*b* in plan view in the lamination direction.

Accordingly, shrinkage of the via coupling portion in firing can be further increased and the void 60 on the second main surface 32*b* of the second coil conductor 31*c* can be further securely formed.

The second via conductor 83*c* overlapping with the first via conductor 33*b* is any one of the plurality of second via conductors 83*c*, but is especially the one that connects one end portions of the two parallel connection coils 81 included in the second coil conductor 31*c* (end portions to which the first via conductor 33*b* is connected).

Further, the third via conductor 83*b* overlapping with the first via conductor 33*b* is any one of the plurality of third via conductors 83*b*, but is especially the one that connects one end portions of the two parallel connection coils 81 included in the first coil conductor 31*b* (end portions to which the first via conductor 33*b* is connected).

As illustrated in FIG. 14, the first, second, and third via conductors 33*b*, 83*c*, and 83*b* may be disposed on the substantially same positions in plan view in the lamination direction.

This structure can further increase the shrinkage of the via coupling portion in firing and makes it possible to further securely form the void 60 on the second main surface 32*b* of the second coil conductor 31*c*.

Further, the first, second, and third via conductors 33*b*, 83*c*, and 83*b* may have the substantially same shape and may be disposed on the substantially same positions, in plan view in the lamination direction. That is, regions occupied by the first, second, and third via conductors 33*b*, 83*c*, and 83*b* may be substantially accorded with each other in plan view in the lamination direction.

Examples of the favorable planar shape of the second via conductor 83*c* and the third via conductor 83*b* include the same shapes as those of the first via conductor 33*b*. Namely, examples of the favorable planar shape of the second via conductor 83*c* and the third via conductor 83*b* include an approximately n polygon (n is an integer which is 3 or greater, for example, 3 to 8, preferably 4 to 6) and a shape having a curve such as substantially circular, elliptic, and oval shapes.

A void locally existing on a position opposed to a via conductor is mostly-easily affected by shrinkage of the closest via conductor. Therefore, in the example illustrated in FIGS. 13 and 14, the void 60 may be normally positioned within a disposing region of the second via conductor 83*c* and may have the substantially same shape as that of the second via conductor 83*c*, in plan view in the lamination direction. However, the void 60 may be positioned within a disposing region of the first via conductor 33*b* and may have the substantially same shape as that of the first via conductor 33*b*, in plan view in the lamination direction. Also, the void 60 may be positioned within a disposing region of the third via conductor 83*b* and may have the substantially same shape as that of the third via conductor 83*b*, in plan view in the lamination direction.

In the example illustrated in FIGS. 13 and 14, there is no void on a position, which is opposed to the first via conductor 33*b*, of the second main surface 32*b* of the lower parallel connection coil 81 constituting the second coil conductor 31*c* because there is the second via conductor 83*c* on the position.

In a similar manner, there is no void on a position, which is opposed to the third via conductor 83*b*, of the second main surface 32*b* of the upper parallel connection coil 81 constituting the first coil conductor 31*b* because there is the first via conductor 33*b* on the position.

In the example illustrated in FIGS. 13 and 14, the maximum thickness of the void 60, which is on the second main surface 32*b* of the second coil conductor 31*c*, in the lamination direction is preferably from approximately 2 μm to 15 μm inclusive, more preferably from approximately 4 μm to 6 μm inclusive.

Figure 15:
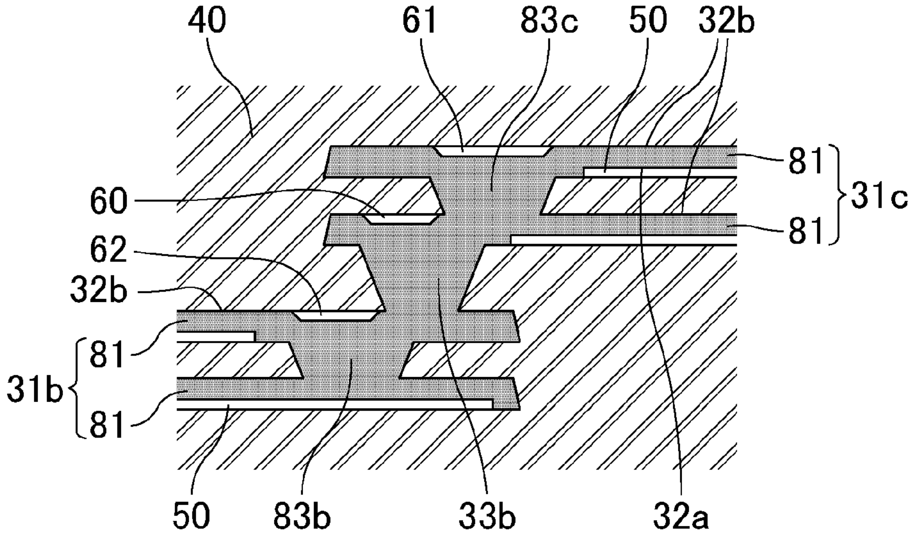
FIG. 15 is an LT sectional view schematically illustrating another example of a first coil conductor and a second coil conductor of the laminated coil component according to the second embodiment.

FIG. 15 is an LT sectional view schematically illustrating another example of a first coil conductor and a second coil conductor of the laminated coil component according to the second embodiment. FIG. 15 is the LT sectional view illustrating a portion on which the via conductors are formed.

FIG. 15 illustrates the coil conductors 31*b* and 31*c* as examples of a first coil conductor and a second coil conductor according to the present disclosure respectively, and illustrates the via conductor 33*b* as an example of a first via conductor according to the present disclosure. However, the same goes to other two coil conductors 31 that are adjacent to each other in the lamination direction and other via conductors 33 respectively interposed between the coil conductors 31.

The example illustrated in FIG. 15 is different from the example illustrated in FIG. 13 in that the disposing positions of the second via conductor 83*c* and the third via conductor 83*b* are slightly shifted from the disposing position of the first via conductor 33*b* and each of the second via conductor 83*c* and the third via conductor 83*b* partially overlaps with the first via conductor 33*b* in the example illustrated in FIG. 15.

The second coil conductor 31*c* has the second main surface 32*b* on which the void 60 exists in a manner to be interposed between this second main surface 32*b* and the insulator portion 40, and the void 60 locally exists on a position opposed to the first via conductor 33*b*, also in the example illustrated in FIG. 15.

However, the void 60 exists between the insulator portion 40 and the second main surface 32*b* of the upper parallel connection coil 81 of the two parallel connection coils 81 constituting the second coil conductor 31*c* in the example illustrated in FIG. 13, while the void 60 exists between the insulator portion 40 and the second main surface 32*b* of the lower parallel connection coil 81 of the two parallel connection coils 81 constituting the second coil conductor 31*c* in the example illustrated in FIG. 15.

Further, the second coil conductor 31*c* has the second main surface 32*b* on which a void 61 exists in a manner to be interposed between this second main surface 32*b* and the insulator portion 40, and the void 61 locally exists on a position opposed to the second via conductor 83*c* in the example illustrated in FIG. 15. Here, the second main surface 32*b* on which the void 61 exists in a manner to be interposed between this second main surface 32*b* and the insulator portion 40 is the second main surface 32*b* of the upper parallel connection coil 81 of the two parallel connection coils 81 constituting the second coil conductor 31*c*.

Furthermore, the first coil conductor 31*b* has the second main surface 32*b* on which a void 62 exists in a manner to be interposed between this second main surface 32*b* and the insulator portion 40, and the void 62 locally exists on a position opposed to the third via conductor 83*b* in the example illustrated in FIG. 15. Here, the second main surface 32*b* on which the void 62 exists in a manner to be interposed between this second main surface 32*b* and the insulator portion 40 is the second main surface 32*b* of the upper parallel connection coil 81 of the two parallel connection coils 81 constituting the first coil conductor 31*b*.

Because of the existence of the voids 60 to 62, the internal stress can be further relaxed while securing required strength of the multilayer body 10 in this example, as is the case with the example illustrated in FIG. 13.

Further, the voids 60 to 62 can be formed without adding a step for forming the voids 60 to 62, so the laminated coil component 1 can be produced with high productivity also in this example.

Figure 16:
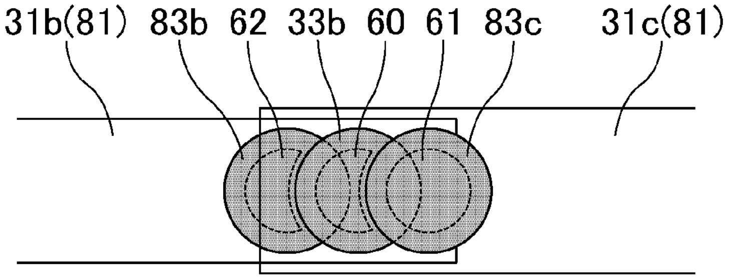
FIG. 16 is a plan view schematically illustrating another example of a via conductor portion of the laminated coil component according to the second embodiment.

FIG. 16 is a plan view schematically illustrating another example of a via conductor portion of the laminated coil component according to the second embodiment. FIG. 16 illustrates an example of a plan view of the example illustrated in FIG. 15.

As illustrated in FIG. 16, the second via conductor 83*c* partially overlaps with the first via conductor 33*b* in plan view in the lamination direction, and the third via conductor 83*b* partially overlaps with the first via conductor 33*b* in plan view in the lamination direction.

The second via conductor 83*c* partially overlapping with the first via conductor 33*b* is any one of the plurality of second via conductors 83*c*, but is especially the one that connects one end portions of the two parallel connection coils 81 included in the second coil conductor 31*c* (end portions to which the first via conductor 33*b* is connected).

Further, the third via conductor 83*b* partially overlapping with the first via conductor 33*b* is any one of the plurality of third via conductors 83*b*, but is especially the one that connects one end portions of the two parallel connection coils 81 included in the first coil conductor 31*b* (end portions to which the first via conductor 33*b* is connected).

As described above, a void locally existing on a position opposed to a via conductor is mostly-easily affected by shrinkage of the closest via conductor. Therefore, in the example illustrated in FIGS. 15 and 16, the void 60 is normally positioned within the disposing region of the first via conductor 33*b* in plan view in the lamination direction. However, as the second via conductor 83*c* partially exists on the position opposed to the first via conductor 33*b*, the void 60 is normally positioned within a region in which the first via conductor 33*b* is disposed and which does not overlap with the second via conductor 83*c*, in plan view in the lamination direction.

The void 61 may be normally positioned within the disposing region of the second via conductor 83*c* and may have the substantially same shape as that of the second via conductor 83*c*, in plan view in the lamination direction.

The void 62 is normally positioned within the disposing region of the third via conductor 83*b* in plan view in the lamination direction. However, as the first via conductor 33*b* partially exists on the position opposed to the third via conductor 83*b*, the void 62 is normally positioned within a region in which the third via conductor 83*b* is disposed and which does not overlap with the first via conductor 33*b*, in plan view in the lamination direction.

In the example illustrated in FIGS. 15 and 16, the maximum thickness of the void 60, which is on the second main surface 32*b* of the lower parallel connection coil 81 of the second coil conductor 31*c*, in the lamination direction is preferably from approximately 1 μm to 10 μm inclusive.

Further, the maximum thickness of the void 61, which is on the second main surface 32*b* of the upper parallel connection coil 81 of the second coil conductor 31*c*, in the lamination direction is preferably from approximately 1 μm to 10 μm inclusive.

Furthermore, the maximum thickness of the void 62, which is on the second main surface 32*b* of the upper parallel connection coil 81 of the first coil conductor 31*b*, in the lamination direction is preferably from approximately 1 μm to 10 μm inclusive.

Figure 17:
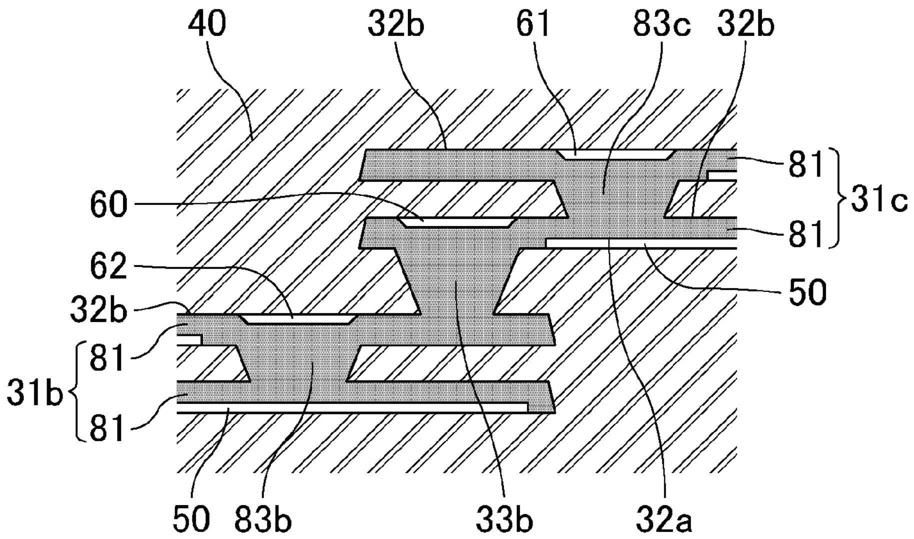
FIG. 17 is an LT sectional view schematically illustrating still another example of a first coil conductor and a second coil conductor of the laminated coil component according to the second embodiment.

FIG. 17 is an LT sectional view schematically illustrating still another example of a first coil conductor and a second coil conductor of the laminated coil component according to the second embodiment. FIG. 17 is the LT sectional view illustrating a portion on which the via conductors are formed.

FIG. 17 illustrates the coil conductors 31*b* and 31*c* as examples of a first coil conductor and a second coil conductor according to the present disclosure respectively, and illustrates the via conductor 33*b* as an example of a first via conductor according to the present disclosure. However, the same goes to other two coil conductors 31 that are adjacent to each other in the lamination direction and other via conductors 33 respectively interposed between the coil conductors 31.

The example illustrated in FIG. 17 is different from the examples illustrated in FIGS. 13 and 15 in that the disposing positions of the second via conductor 83*c* and the third via conductor 83*b* are shifted from the disposing position of the first via conductor 33*b* and the first, second, and third via conductors 33*b*, 83*c*, and 83*b* do not overlap with each other in the example illustrated in FIG. 17.

Also in the example illustrated in FIG. 17, the second coil conductor 31*c* (the lower parallel connection coil 81 constituting the second coil conductor 31*c*) has the second main surface 32*b* on which the void 60 exists in a manner to be interposed between this second main surface 32*b* and the insulator portion 40, and the void 60 locally exists on a position opposed to the first via conductor 33*b*, as is the case with the example illustrated in FIG. 15.

Further, the second coil conductor 31*c* (the upper parallel connection coil 81 constituting the second coil conductor 31*c*) has the second main surface 32*b* on which the void 61 exists in a manner to be interposed between this second main surface 32*b* and the insulator portion 40, and the void 61 locally exists on a position opposed to the second via conductor 83*c*.

Furthermore, the first coil conductor 31*b* (the upper parallel connection coil 81 constituting the first coil conductor 31*b*) has the second main surface 32*b* on which the void 62 exists in a manner to be interposed between this second main surface 32*b* and the insulator portion 40, and the void 62 locally exists on a position opposed to the third via conductor 83*b*.

Because of the existence of the voids 60 to 62, the internal stress can be further relaxed while securing required strength of the multilayer body 10 also in this example, as is the case with the example illustrated in FIG. 15.

Further, the voids 60 to 62 can be formed without adding a step for forming the voids 60 to 62, so the laminated coil component 1 can be produced with high productivity also in this example.

Figure 18:
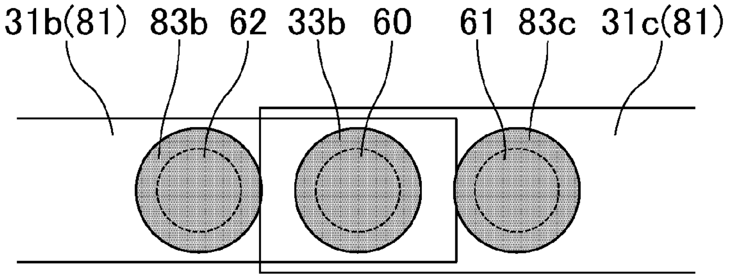
FIG. 18 is a plan view schematically illustrating still another example of a via conductor portion of the laminated coil component according to the second embodiment.

FIG. 18 is a plan view schematically illustrating still another example of a via conductor portion of the laminated coil component according to the second embodiment. FIG. 18 illustrates an example of a plan view of the example illustrated in FIG. 17.

As illustrated in FIG. 18, any of the plurality of second via conductors 83*c* (FIG. 18 shows only one) does not overlap with the first via conductor 33*b* in plan view in the lamination direction, and any of the plurality of third via conductors 83*b* (FIG. 18 shows only one) does not overlap with the first via conductor 33*b* in plan view in the lamination direction.

In the example illustrated in FIGS. 17 and 18, the void 60 may be normally positioned within the disposing region of the first via conductor 33*b* and may have the substantially same shape as that of the first via conductor 33*b*, in plan view in the lamination direction.

Further, the void 61 may be normally positioned within the disposing region of the second via conductor 83*c* and may have the substantially same shape as that of the second via conductor 83*c*, in plan view in the lamination direction.

Furthermore, the void 62 may be normally positioned within the disposing region of the third via conductor 83*b* and may have the substantially same shape as that of the third via conductor 83*b*, in plan view in the lamination direction.

In the example illustrated in FIGS. 17 and 18, the maximum thickness of the void 60, which is on the second main surface 32*b* of the lower parallel connection coil 81 of the second coil conductor 31*c*, in the lamination direction is preferably from approximately 1 μm to 10 μm inclusive.

Further, the maximum thickness of the void 61, which is on the second main surface 32*b* of the upper parallel connection coil 81 of the second coil conductor 31*c*, in the lamination direction is preferably from approximately 1 μm to 10 μm inclusive.

Furthermore, the maximum thickness of the void 62, which is on the second main surface 32*b* of the upper parallel connection coil 81 of the first coil conductor 31*b*, in the lamination direction is preferably from approximately 1 μm to 10 μm inclusive.

The maximum thickness of the voids 60, 61, and 62 in the lamination direction in the examples illustrated in FIGS. 15 to 18 may be different from, namely smaller than the maximum thickness of the void 60 in the lamination direction in the example illustrated in FIGS. 13 and 14. This is because the shrinkage of the via coupling portion tends to be smaller in the former case than that in the latter case.

A method for manufacturing the laminated coil component according to the present embodiment will now be described.

The laminated coil component according to the present embodiment can be basically produced by forming two sheets of the coil sheets 71*a*, 71*b*, 71*c*, and 71*d*, described in FIGS. 7 to 10, at a time and laminating the eight sheets in total.

However, two via holes are formed on positions corresponding to one end and the other end of parallel connection coils 81 on the insulator sheet between two parallel connection coils 81 which are connected in parallel.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A laminated coil component comprising:

a multilayer body in which a coil is disposed inside of an insulator portion, the insulator portion including a plurality of insulation layers laminated together; and an outer electrode on an outer surface of the multilayer body and electrically connected with the coil, wherein the coil is configured such that a plurality of coil conductors, which are laminated with the plurality of insulation layers, are electrically connected with each other with a via conductor interposed therebetween, each of the plurality of coil conductors has a first main surface facing an opposite direction to a lamination direction and a second main surface facing the lamination direction, the plurality of coil conductors include a first coil conductor and a second coil conductor, the first coil conductor and the second coil conductor being adjacent to each other in the lamination direction, the first coil conductor and the second coil conductor are electrically connected with each other in series with a first via conductor interposed therebetween, the first coil conductor, the first via conductor, and the second coil conductor are disposed in this order in the lamination direction, the first coil conductor has a first main surface on which a void exists interposed between the first main surface of the first coil conductor and the insulator portion, the second coil conductor has a first main surface on which a void exists interposed between the first main surface of the second coil conductor and the insulator portion and a second main surface on which an other void exists interposed between the second main surface of the second coil conductor and the insulator portion, and the other void interposed between the second main surface of the second coil conductor and the insulator portion locally exists on a position opposed to the first via conductor.

2. The laminated coil component according to claim 1, wherein a ratio of a width of the other void, which exists on the position opposed to the first via conductor, in a direction orthogonal to the lamination direction with respect to a width of the first via conductor in the direction orthogonal to the lamination direction is from 0.5 to 1.0 inclusive.

3. The laminated coil component according to claim 2, wherein the second coil conductor includes two coil conductors that are electrically connected in parallel with a plurality of second via conductors interposed therebetween.

4. The laminated coil component according to claim 3, wherein any one of the plurality of second via conductors overlaps with the first via conductor in plan view in the lamination direction.

5. The laminated coil component according to claim 4, wherein a pore area ratio of the coil is from 5% to 15% inclusive.

6. The laminated coil component according to claim 3, wherein a pore area ratio of the coil is from 5% to 15% inclusive.

7. The laminated coil component according to claim 2, wherein the first coil conductor includes two coil conductors that are electrically connected in parallel with a plurality of third via conductors interposed therebetween.

8. The laminated coil component according to claim 7, wherein a pore area ratio of the coil is from 5% to 15% inclusive.

9. The laminated coil component according to claim 2, wherein a pore area ratio of the coil is from 5% to 15% inclusive.

10. The laminated coil component according to claim 1, wherein the second coil conductor includes two coil conductors that are electrically connected in parallel with a plurality of second via conductors interposed therebetween.

11. The laminated coil component according to claim 10, wherein any one of the plurality of second via conductors overlaps with the first via conductor in plan view in the lamination direction.

12. The laminated coil component according to claim 11, wherein the first coil conductor includes two coil conductors that are electrically connected in parallel with a plurality of third via conductors interposed therebetween.

13. The laminated coil component according to claim 11, wherein a pore area ratio of the coil is from 5% to 15% inclusive.

14. The laminated coil component according to claim 10, wherein the first coil conductor includes two coil conductors that are electrically connected in parallel with a plurality of third via conductors interposed therebetween.

15. The laminated coil component according to claim 10, wherein a pore area ratio of the coil is from 5% to 15% inclusive.

16. The laminated coil component according to claim 1, wherein the first coil conductor includes two coil conductors that are electrically connected in parallel with a plurality of third via conductors interposed therebetween.

17. The laminated coil component according to claim 16, wherein any one of the plurality of third via conductors overlaps with the first via conductor in plan view in the lamination direction.

18. The laminated coil component according to claim 17, wherein a pore area ratio of the coil is from 5% to 15% inclusive.

19. The laminated coil component according to claim 16, wherein a pore area ratio of the coil is from 5% to 15% inclusive.

20. The laminated coil component according to claim 1, wherein a pore area ratio of the coil is from 5% to 15% inclusive.

* * * * *